United States Patent [19]

Schmidt

[11] Patent Number: 5,314,288

[45] Date of Patent: May 24, 1994

[54] WHEEL-LIFT MECHANISM

[75] Inventor: Horst Schmidt, Windsor, Canada

[73] Assignee: Build-A-Mold Limited, Windsor, Canada

[21] Appl. No.: 713,427

[22] Filed: Jun. 10, 1991

[51] Int. Cl.⁵ .......................................... B62D 43/04
[52] U.S. Cl. ................................. 414/463; 254/323; 254/903; 464/34; 464/39
[58] Field of Search ................. 254/323, 903; 414/463; 464/34, 37, 38, 39

[56] References Cited

U.S. PATENT DOCUMENTS

| | | | |
|---|---|---|---|
| 1,126,219 | 1/1915 | Hupp | 464/38 |
| 1,395,592 | 11/1921 | Odom | 464/37 X |
| 2,400,274 | 5/1946 | Ullman | 414/463 |
| 3,071,942 | 1/1963 | Alcaro | 464/78 |
| 3,844,137 | 10/1974 | Zugel | 464/78 |
| 4,915,358 | 4/1990 | Stallings | 254/323 |
| 4,997,164 | 3/1991 | Kito et al. | 414/463 X |
| 5,041,060 | 8/1991 | Hendershot | 464/99 X |
| 5,125,628 | 6/1992 | Rempinski et al. | 254/323 |

Primary Examiner—Michael S. Huppert
Assistant Examiner—Janice Krizek

[57] ABSTRACT

A simplified wheel-lift mechanism is disclosed. The components of the wheel-lift mechanism are all formed of a plastic material that is corrosion resistant. Further, the wheel-lift mechanism includes a one-piece flexible coupling which reduces the complexity of the system over prior art systems. The one-piece flexible coupling includes a plurality of integrally molded discs connected by a plurality of circumferentially-spaced integrally molded posts. This results in a strong coupling which allows relative angular motion between the ends of the coupling. In a further feature of this invention, a locking key is operable to lock the wheel hub at a particular location. The locking key is selectively released to allow the wheel to be lowered. A unique drive mechanism is also included.

6 Claims, 2 Drawing Sheets

WHEEL-LIFT MECHANISM

BACKGROUND OF THE INVENTION

This application relates to a simplified mechanism for raising and lowering a wheel hub relative to a vehicle body.

Several types of lift mechanisms are known for raising and lowering a spare wheel to and from a storage position beneath a vehicle body. These systems may be powered manually by inserting an elongate tool into a shaft and turning the shaft. In the past, these systems have typically utilized several metallic members, and have been subject to corrosion. The underside of the vehicle where the wheel-lift mechanism has typically been located is subject to adverse environmental conditions, and thus also subject to corrosion.

Further, the known prior art systems have been relatively complex. The prior art systems typically include a large number of moving parts that are both expensive and complex to manufacture and assemble.

It is therefore an object of the present invention to disclose a simplified tire-lift system which is more resistant to corrosion.

SUMMARY OF THE INVENTION

An improved wheel-lift mechanism includes a one-piece flexible coupling which connects two shaft portions. The one-piece coupling reduces the number of moving parts, thus reducing the complexity of manufacturing and assembling the wheel-lift system.

The entire wheel-lift system, other than a flexible lift member which actually lifts and raises the tire hub is formed of plastic. The plastic members are more resistant to corrosion than prior art systems, and also less expensive to manufacture.

In another feature of the present invention, the system includes a first shaft connected to the flexible coupling which in turn drives a second shaft. The second shaft rotates an eccentrically mounted externally toothed gear. A fixed internally toothed gear contacts the externally toothed gear as it rotates. The externally toothed gear is fixed to a reel containing an amount of a flexible lift cable. When the reel is rotated, the flexible cable is either dispensed or reeled back onto the reel, which in turn raises and lowers a wheel hub.

These and other objects and features of the present invention can be best understood from the following specification and drawings, of which the following is a brief description.

DETAILED DESCRIPTION OF A PREFERRED EMBODIMENT

Figure 1:
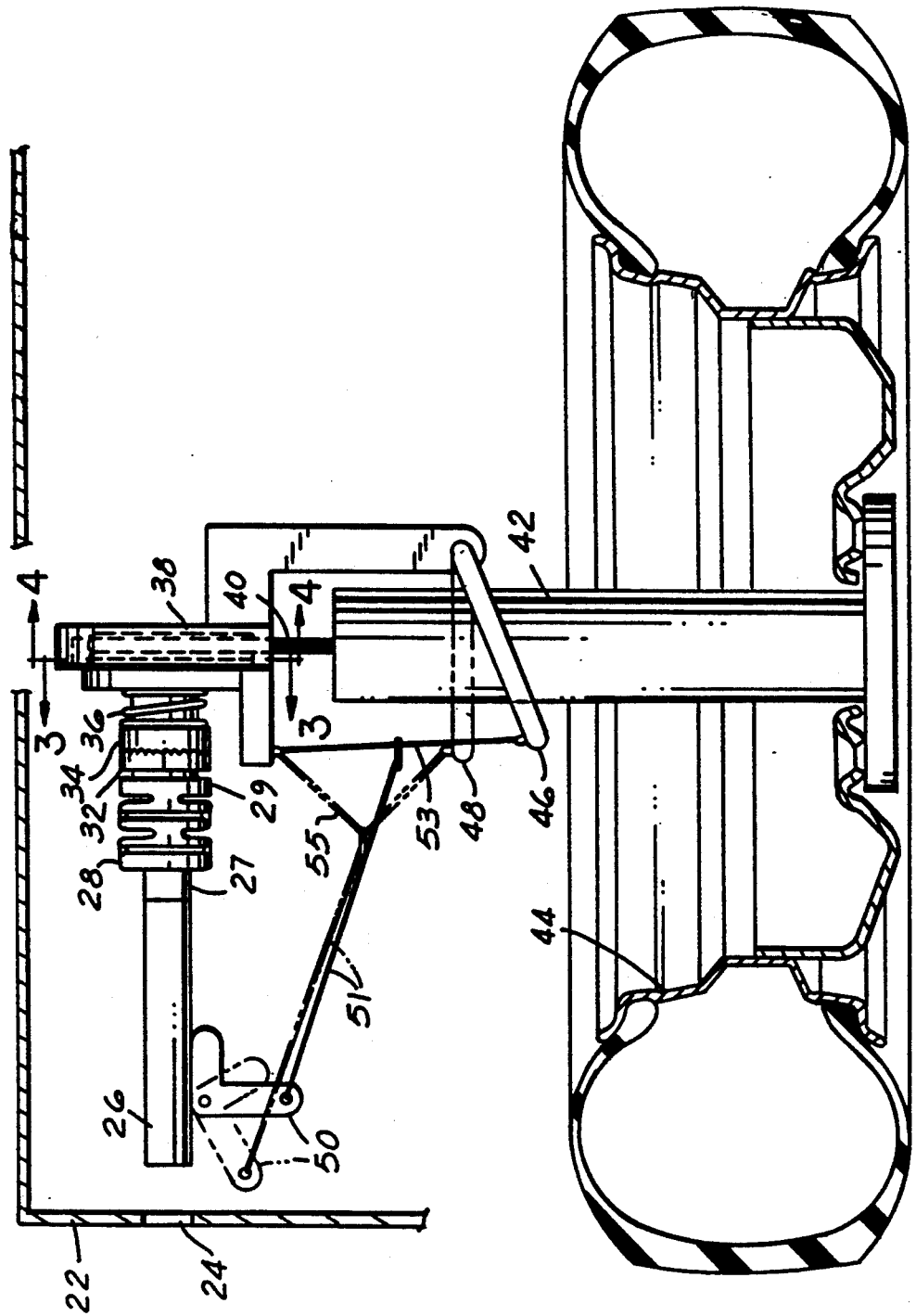
FIG. 1 is a largely schematic view of a tire-lift system incorporating the inventive coupling.

As illustrated in FIG. 1, wheel lift system 20 is mounted beneath vehicle body 22. Access hole 24 extends through the rear of vehicle body 22. Hole 24 may typically extend through the rear of a van or similar vehicle. The size of vehicle body 22 relative to the size of wheel lift system 20 is reduced to better illustrate the components of wheel lift system 20.

Wheel lift system 20 includes first shaft 26 connected to shaft coupling 27 at one end of a one-piece flexible coupling 28. A similar shaft coupling 29 is connected to first toothed member 32, which is engaged with a second toothed member 34. Toothed member 34 is biased by spring 36 into toothed member 32, and provides a torque limiting structure. Should the force between members 32 and 34 overcome the force of spring 38, member 34 moves out of mesh with member 32, and drive is no longer transmitted. Toothed member 34 drives a rotary transmission within housing 38, which raises and lowers cable 40. One end of cable 40 is fixed in tee 42, which is received in the hub 44 of a tire. By raising and lowering cable 40 one may raise and lower the tire.

Lock member 46 is normally pivoted to an angle which is non-perpendicular to the axis of tee 42. An aperture in lock member 46 is received on tee 42. When lock member 46 is in this position, it grips tee 42 and provides an override lock, preventing lowering of the tire should cable 40 break, or be inadvertently lowered. When lock member 46 is pivoted to a release position, shown in phantom 48, the aperture no longer grips the outer periphery of tee 42 and the tire can be lowered. Pivot member 50 is pivoted to pull cable 51 which pulls a second cable 53 to a release position 55, shown in phantom, which in turn moves lock member 46 to released position 48.

To operate system 20, an implement is inserted through hole 24 and into shaft 26. Shaft 26 is pivoted downwardly as shown in FIG. 1, and lever 50 pivots forwardly such that lock member 46 is moved to phantom position 48. Shaft 26 may then be turned such that cable 40 and tire hub 44 are lowered to the ground.

Figure 2:
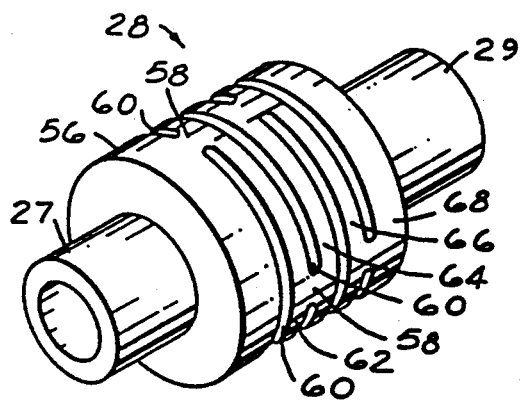
FIG. 2 is a perspective view of the inventive coupling.

One-piece coupling 28 is illustrated in FIG. 2. First shaft connector 27 is formed at one end, while second shaft connector 29 is formed at the other end. First disc 56 is formed integrally with shaft connector 27 and a connection post 58 connects first disc 56 to a second disc 62. Slots 60 are formed between discs 56 and 62 on each circumferential side of post 58. Similarly, posts 58 and slots 60 are formed between second disc 62 and a third disc 64. Two posts 58 are preferably formed between each pair of discs, although only one is illustrated. Posts 58 between first disc 56 and second disc 62 are offset 90° from the posts between second disc 62 and the third disc 64. Posts 58 and slots 60 are also formed between third disc 64 and a fourth disc 66. Posts 58 are positioned similarly to those between first disc 66 and second disc 62. A fourth disc 66 is connected to fifth disc 68 through posts 58 which are positioned similarly to that between second and third discs 62, 64. Coupling 28 is the subject of co-pending application Ser. No. 07/713,425, filed Jun. 10, 1991 entitled "One-Piece Flexible Coupling" and invented by the inventor of the present application.

When a shaft connected to shaft coupling 27 is pivoted relative to the remainder of coupling 28, such as would happen in the system shown in FIG. 1 when shaft 26 is pivoted downwardly, rotation is still transmitted from shaft coupling 27 to shaft coupling 29. Slots 60 allow discs to flex about posts 58 and take up the difference in the angles between the couplings 27 and 29. Torque can still be transmitted through coupling 28 such that devices connected to shaft coupling 29 can still be powered.

The discs are preferably solid cylinders, the posts are preferably cylindrical and the connectors are preferably hollow. Such shapes optimize torque transfer and flexibility.

In designing shaft 28, one may vary the cross-sectional area of posts 58, and the thickness of the discs to increase the ability to transmit torque. Further, the length of posts 58, which is equal to the spacing between the discs, may be varied. Generally, the greater the area of posts 58 or the thickness of the discs, the greater the torque that can be transmitted. The length of the post has the opposite effect. As this ability to transmit torque increases, the ability to transmit rotation at distinct angles, or the flexibility of the coupling, decreases. Shear equations are commonly known for determining the torque a coupling will transmit without failure.

Figure 3:
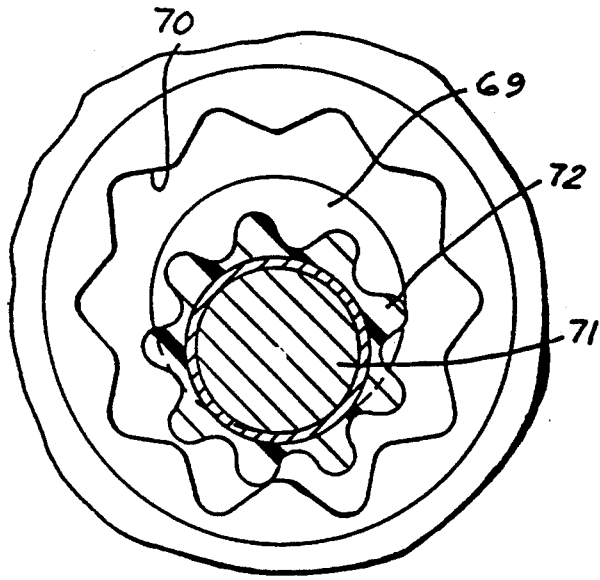
FIG. 3 is a cross-sectional view along line 3—3 as shown in FIG. 1.

FIG. 3 is a view along line 3—3 as shown in FIG. 1. When toothed gear 34 is rotated by toothed gear 32, see FIG. 1, it rotates shaft 69. An internally toothed gear 70 is fixed and integral with housing 38. Shaft 69 has an eccentric shaft 71 which receives an externally toothed gear 72. Gear 72 is fixed to rotate with a reel within housing 38, as will be described below. When shaft 69 rotates it rotates shaft 71, which moves gear 72 along gear 70, causing gear 72 to counterrotate about shaft 71. By varying the relative number of teeth on gears 70 and 72, one controls the ratio between the input and output for driving the reel within housing 38.

Figure 4:
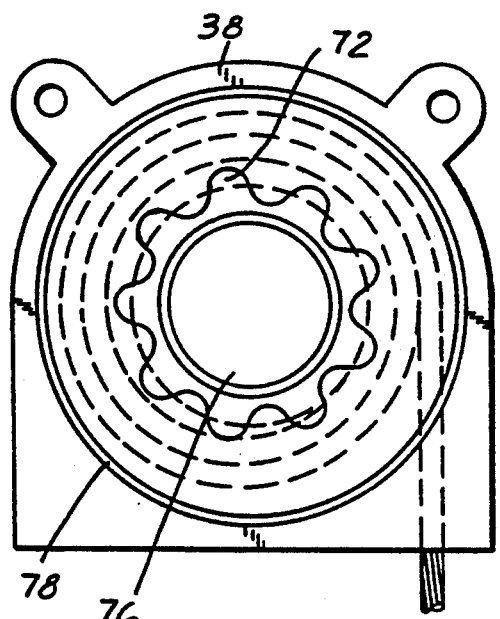
FIG. 4 is a cross-sectional view along line 4—4 as shown in FIG. 1.

FIG. 4 is a view along line 4—4 and shows shaft 76 which is integrally attached to shaft 71. Gear 72 is fixed to a face of reel 78, and reel 78 moves on shaft 76, and with gear 72 as it walks along gear 70. Cable 80 is received on reel 78 and within housing 38.

When toothed gear 34 rotates, it rotates shaft 71, which moves gear 72, and the integral reel 78. Cable 80 is moved into or out of housing 38. In this way wheel hub 44 may be raised and lowered.

Figure 5:
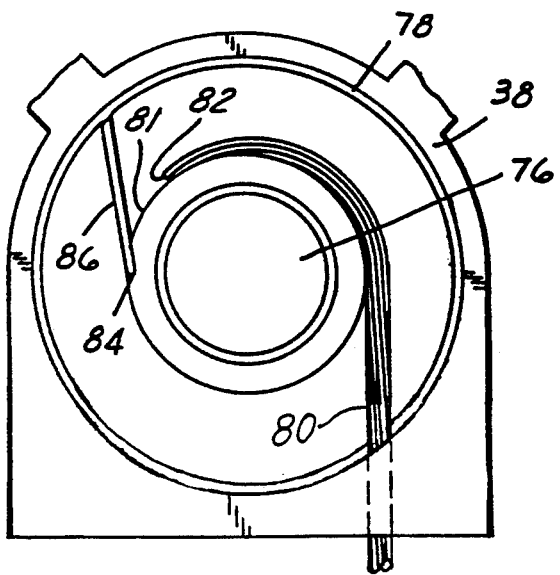
FIG. 5 is a view similar to FIG. 4, but showing the tire lowered.

As shown in FIG. 5, one end 82 of cable 80 is fixed to an inner portion 82 of reel 78. Spring finger 86 is biased radially inwardly relative to shaft 76 and catches notch 84 in reel 78 once all cable 80 has moved off of reel 78. Finger 86 locks in notch 84, such that reel 78 cannot be rotated any further. This defines a stop, preventing further lowering of cable 80.

It is preferred that the one-piece flexible coupling be injection molded. The mold body would preferably have structure to form the discs, posts 58, slots 60, and shaft couplings 27 and 29. By cooling the shaft coupling portions 27 and 29 quicker than the discs or posts, the shaft couplings will become more rigid.

The cable is preferably braided steel, stainless steel or a strong fiber. The other members are all preferably formed from a suitable plastic.

In one preferred embodiment of the present invention coupling 28 had 6 spaced discs. The discs were 0.50 inches in axial length, and 1.5 inches in diameter. Slots 60 between the adjacent discs were 0.6 inches in length. Posts 58 were cylinders that were 0.25 inches in diameter. The joint is preferably formed of a nylon, and preferably one available under the trade name Nylon 6/6.

Although coupling 28 is preferably injection molded, with mold body portions forming slots 60 and posts 58, it should be understood that other ways of forming coupling 28 may be utilized. As an example, coupling 28 could be molded as a one-piece cylindrical item without slots 60. Slots 60 could then be cut into the cylindrical body. Further, although coupling 28 is preferably formed from plastic, other polymers such as molded rubber may be used.

A preferred embodiment of the present invention has been disclosed, however, a worker of ordinary skill in the art would recognize that certain modifications would come within the scope of this invention. For that reason the following claims should be studied in order to determine the true scope and content of the invention.

I claim:

1. A wheel-lift mechanism comprising:

a first shaft connected to a first end of a coupling, said coupling having a second end connected to a second shaft, said coupling being operable to transmit rotation from said first shaft to said second shaft even when said first and second shafts occupy non-parallel orientations relative to each other, said second shaft being connected to a reel for raising and lowering a flexible lift member, said flexible lift member being operably connected to a wheel hub to raise and lower said wheel hub; and a tee is received in said wheel hub, one end of said flexible lift member extends through said tee, a locking member is positioned over said tee, said locking member preventing said tee from moving downwardly to lower said wheel hub when said locking member is in the locked position, said locking member being movable to a release position in which the locking member allows said tee to move vertically.

2. The wheel-lift mechanism as recited in claim 1, wherein said locking member has an aperture in a tab portion, said aperture being biased to a position such that it extends at a non-perpendicular angle relative to a longitudinal axis of said tee and said flexible lift member, said tee being locked when said aperture is at said non-perpendicular position, said locking member being movable to a released position in which said aperture extends at an angle generally perpendicular to the axis of said tee such that said tee may move through said aperture.

3. The wheel-lift mechanism as recited in claim 1, wherein said flexible lift member is a braided steel cable.

4. The wheel-lift mechanism as recited in claim 1, wherein said flexible lift member is received on a reel, a spring finger is biased towards a center of said reel, said spring finger engaging a notch in an inner periphery of said reel when said flexible lift member has all been dispensed from said reel and said wheel hub is lowered.

5. A wheel-lift mechanism as recited in claim 1, wherein said second shaft is connected to a first sub-shaft portion which has teeth engaging a second sub-shaft portion, said second sub-shaft portion being biased into engagement with said first sub-shaft portion, said second sub-shaft overcoming the spring force of bias and moving out of engagement with said first sub-shaft portion such that rotation is no longer transmitted, should a torque above a pre-determined limit be applied between said first and second sub-shafts.

6. A wheel-lift mechanism as recited in claim 1, wherein said first and second shafts and said coupling are all formed from plastic.

* * * * *